United States Patent
Knepper et al.

(10) Patent No.: US 9,692,478 B1
(45) Date of Patent: Jun. 27, 2017

(54) INFORMATION HANDLING SYSTEM DYNAMIC ANTENNA MANAGEMENT

(71) Applicant: Dell Products L.P., Round Rock, TX (US)

(72) Inventors: Lawrence E. Knepper, Leander, TX (US); Liam Prendergast, Limerick (IE); Benny J. Bologna, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 14/970,948

(22) Filed: Dec. 16, 2015

(51) Int. Cl.
| | | |
|---|---|---|
| H04B 1/44 | (2006.01) | |
| H04B 1/40 | (2015.01) | |
| H04B 1/3827 | (2015.01) | |
| G06F 3/0488 | (2013.01) | |

(52) U.S. Cl.
CPC ............ *H04B 1/40* (2013.01); *G06F 3/0488* (2013.01); *H04B 1/3838* (2013.01)

(58) Field of Classification Search
None
See application file for complete search history.

(56) References Cited

U.S. PATENT DOCUMENTS

| | | | | |
|---|---|---|---|---|
| 7,142,886 | B2* | 11/2006 | Murayama | G06F 1/1616 343/702 |
| 7,620,424 | B2* | 11/2009 | Cetiner | H01Q 21/061 343/700 MS |
| 8,725,213 | B2* | 5/2014 | Nakamura | H01Q 1/243 455/550.1 |
| 8,781,420 | B2 | 7/2014 | Schlub et al. | |
| 8,929,841 | B2* | 1/2015 | Rofougaran | H01Q 1/2283 345/173 |
| 2009/0284438 | A1 | 11/2009 | Matsunaga et al. | |
| 2016/0126619 | A1* | 5/2016 | Tenbroek | H01Q 1/50 343/745 |
| 2016/0173172 | A1* | 6/2016 | Greene | H04B 7/0404 455/562.1 |

* cited by examiner

*Primary Examiner* — Tuan A Tran
(74) *Attorney, Agent, or Firm* — Terrile, Cannatti, Chambers & Holland, LLP; Robert W. Holland

(57) ABSTRACT

A portable information handling system has plural antennae integrated in a housing proximate a touchscreen display. An antenna controller interfaced with the touchscreen display alters performance settings of the plural antennae, such as impedance tuning settings and selection of one or more antenna as active and/or idle. Touchscreen display touched locations and touch area sizes are associated in a table with predetermined performance settings for lookup by the antenna controller.

16 Claims, 5 Drawing Sheets

INFORMATION HANDLING SYSTEM DYNAMIC ANTENNA MANAGEMENT

BACKGROUND OF THE INVENTION

Field of the Invention

The present invention relates in general to the field of information handling system wireless communication, and more particularly to information handling system dynamic antenna management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally have processing components, input/output (I/O) devices, and power sources integrated into housings sized to provide users with mobility. For example, a typical tablet information handling system has a planar housing with a touchscreen display disposed on one side that both presents information and accepts touch inputs. Other more powerful portable information handling systems trade some mobility for increased processing capability by increasing the size of the housing to have additional room for processing components and thermal management. For example, portable information handling systems with a clamshell configuration typically include a physical keyboard and a rotationally coupled lid that houses a display for presenting information as visual images. End users thus have a variety of options when selecting portable information handling systems to balance mobility and performance.

One advantage of portable information handling systems is that mobile operations are available without hardwired connections to power, network and peripheral resources. For example, a user can run a portable information handling system on battery power and then interact with an integrated keyboard and display free from any cabled connections. Wireless networking further enhances portable information handling system mobility by allowing a user to interact with network resources without a networking cable. For example, standardized wireless local area networks (WLAN) and wireless wide area networks (WWAN) allow a user to have a cable-free portable information handling system with communication bandwidth substantially equal to cabled bandwidth. Further, standardized wireless personal area network (WPAN) interfaces, such as Bluetooth and 60 GHz communication protocols, allow a user to interact with larger and more convenient peripheral devices without a cabled connection. For example, a tablet information handling system that uses a relatively small touchscreen as both an input and output device becomes the equivalent of a desktop system by wirelessly interfacing with a peripheral keyboard and peripheral display. Thus, a low-profile portable device provides a user with ready access to a portable and cable-free office wirelessly interconnected to local peripheral devices and remote network resources.

Although wireless communication works well in the proper environment, users often need wireless connectivity under less-than-ideal conditions, such as where wireless signals are weak. In order to effectively receive and transmit wireless signals, portable information handling systems have to include antennae sized and tuned for the signal wavelengths. Thin mobile information handling system platforms and narrow display borders have forced antenna locations that lie in close proximity to end user input devices, such as along the edge of a touchscreen. End user contact or proximity to an antenna structure tends to impact loading through reactive near field effects, thus degrading impedance matching between the antenna and radio circuitry. Degrade impedance matching reduces antenna efficiency, resulting in poor signal transmission and reception as antenna resonance shifts and antenna bandwidth narrows. In some cases, radio circuitry can increase transmission power to make up for degraded antenna efficiency, however this impacts power consumption and battery life. In addition, radiation restrictions limit transmission power increases when human body parts are next to an antenna, such as the specific absorption requirements (SAR).

SUMMARY OF THE INVENTION

Therefore, a need has arisen for a system and method which provides an information handling system dynamic antenna management.

In accordance with the present invention, a system and method are provided which substantially reduce the disadvantages and problems associated with previous methods and systems for managing information handling system antenna. Touchscreen display inputs made by an end user are monitored for impact on antenna performance. Touch location and touch area size relative to an antenna location are applied to adjust antenna performance settings, such as by lookup at an antenna performance table.

More specifically, a portable information handling system has processing components disposed in a housing that process information, such as a central processing unit (CPU) interfaced with memory and managed by firmware executing in a chipset. Information is presented to an end user as visual images at a touchscreen display integrated in the housing that also accepts touch inputs. Plural antenna located proximate the touchscreen display support wireless communication by an integrated transceiver, such as wireless personal area network (WPAN), wireless wide area network (WWAN) and wireless local area network (WLAN) communications. An antenna controller interfaced with the touchscreen display and the antennae monitors end user touches at the touchscreen display to adjust performance settings at one or more of the antennae. For example, if touch patterns at the display approximate a touch pattern stored in an antenna performance table, the antenna controller tunes the antenna with impedance settings associated with the touch pattern. Alternatively, the antenna controller selects one or more antenna from plural antennae to interface with the transceiver, the selection based upon the antenna that has the best performance.

The present invention provides a number of important technical advantages. One example of an important technical advantage is that antenna efficiency at an information handling system is monitored and managed by leveraging existing touchscreen sensors to adapt antenna to likely impedance changes implicated due to reactive near field effects. Touches sensed at a touchscreen display are extrapolated to likely near field antenna effects and applied to adjust antenna impedance for improved antenna performance at lower transmission signal strengths with resulting power consumption and battery life improvements. A table of stored impedance adjustments that are associated with touch positions provide rapid and accurate antenna selection and tuning for improved wireless performance automatically implemented without user inputs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system integrated touchscreen detects touches and applies the touch pattern of location and area to manage antenna performance settings. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
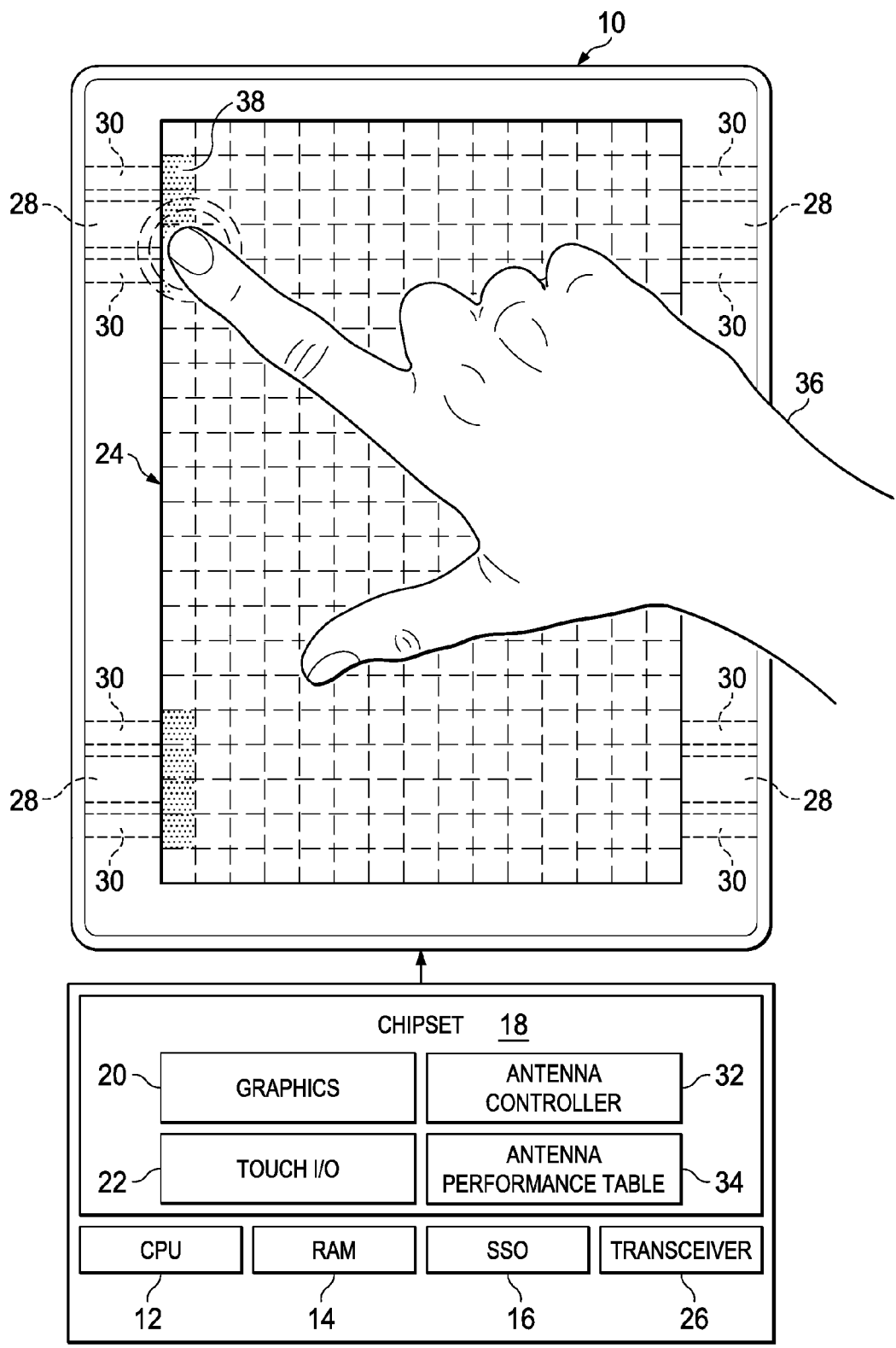
FIG. 1 depicts a portable information handling system having antenna performance setting management.

Referring now to FIG. 1, a portable information handling system 10 having antenna performance setting management is depicted. Portable information handling system 10 processes information with components disposed in a portable housing. In the example embodiment, a central processing unit 12 processes information by executing instructions stored in a random access memory (RAM) 14. A solid state drive (SSD) 16 provides persistent memory to store information while power is off, such as an operating system and applications. A chipset 18 includes processing components and firmware instructions that perform management functions to coordinate processing, communication and presentation of information. For example, a graphics processor 20 generates visual information pixel values to present at a display 24, and a touch input/output (I/O) module quantifies touch inputs made to the surface of display 24. Display 24 is a conventional touchscreen display that is integrated at an exposed surface of information handling system 10, such as one side surface of a planar housing of a tablet configuration or one side surface of a lid portion of a "clamshell" or convertible configuration. In various embodiments, various types of housing configurations may integrate touchscreen displays 24 in various ways.

Portable information handling system 10 communicates wirelessly with a transceiver 26, such as to communicate through WLAN, WPAN and WWAN interfaces. Transceiver 26 interfaces with one or more antenna 28 located at dispersed locations along the edge of display 24 to send and receive wireless signals. Each antenna 28 in the example embodiment has a proximity sensor 30 on each side to detect an end user touch that may cause wireless signal interference, such as near field effect interference that impacts the effectiveness of the antenna. In addition, an antenna controller 32 interfaced with touch I/O 22 manages performance settings of antenna 28 based upon touches by an end user 36 to display 24. For example, antenna controller 32 determines a touch location and touch area size and compares entries of antenna performance table 34 for similar patterns of touch location and touch size. If a similar touch pattern is found, then antenna controller 32 alters the performance settings of antennae 28 to the matching performance settings of table 34 for the detected touch pattern. The performance settings include, for example, impedance tuning settings for the antennae and/or selection of one or more antenna to be in active or idle states.

In the example embodiment depicted by FIG. 1, the amount and location of area of a display touch sensor that detects touches provides antenna controller 32 with information regarding the amount of body contact a user has with the information handling system 10, such as 1 finger, multiple fingers, a palm or a full hand grip. Information regarding touch proximate an antenna structure allows modification of antenna tuning to a resonance frequency that is predetermined for similar types of touch patterns. Antenna controller 32 and antenna performance table 34 may be firmware in chipset 18, such as an embedded controller and BIOS structure, firmware in transceiver 26, firmware in display 24 or other types of processing components. Although touches outside of display 24 are not detected, predicted touch areas may be determined based upon the direction and area of touches detected at display 24. For example, detection of a thumb on display 24 allows prediction of finger locations on the back of display 24 that impact antenna efficiency. Other display information may also be applied to predict antenna performance settings. For example, presentation of a keyboard provides prediction of touches in the keyboard area. Similarly, presentation of a game input icon provides prediction of touches at the icon and gripping of the portable information handling system housing to support such touches. Antenna controller 32 applies detected and predicted touches to select antenna performance settings that improve antenna efficiency, such as by changing impedance tuning settings or selecting one or more antenna to perform communication functions that are least impacted by end user presence.

Figure 2:
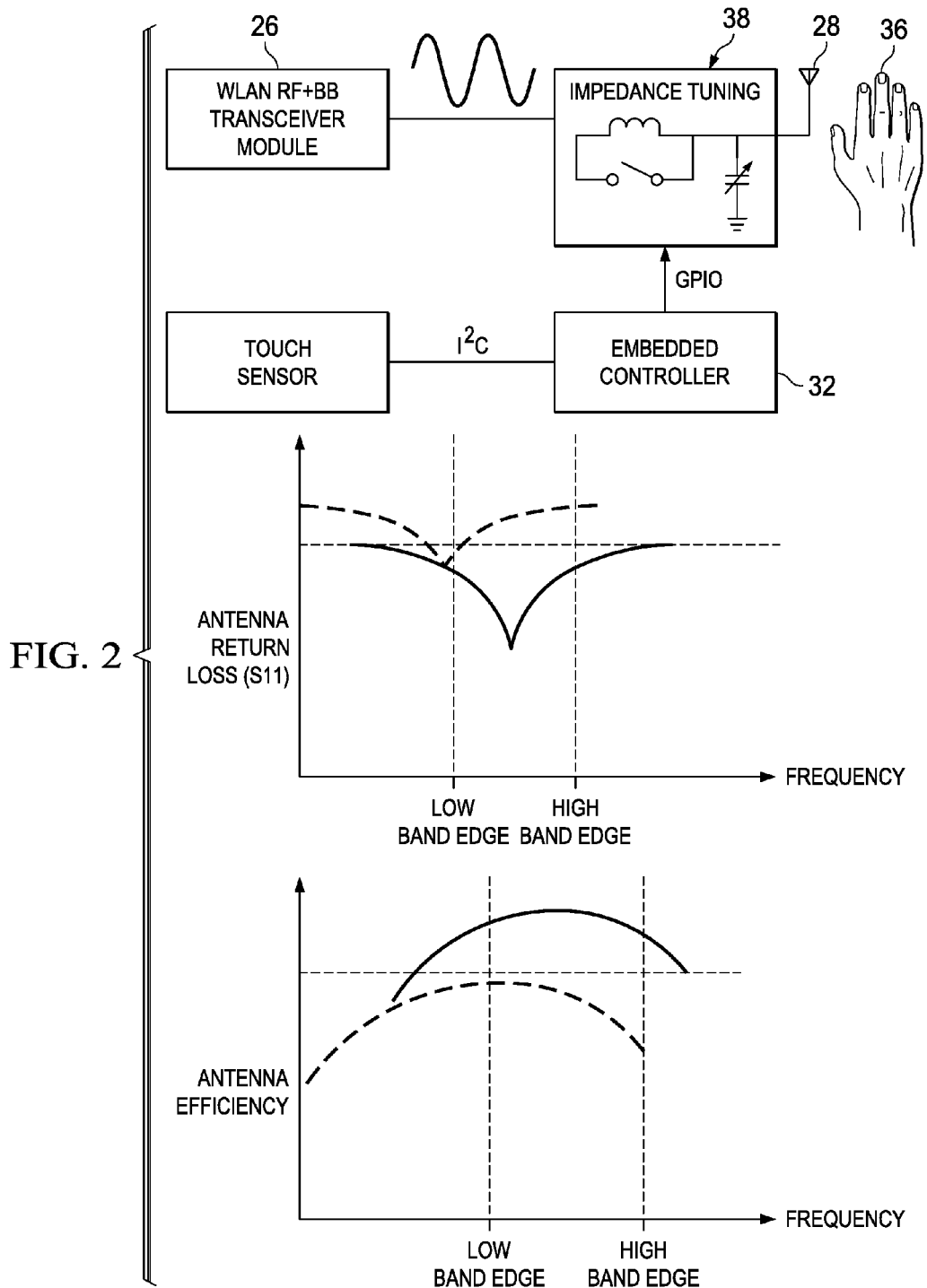
FIG. 2 depicts an example of performance setting management to alter antenna impedance in response to touches detected at a touchscreen.

Referring now to FIG. 2, an example is depicted of performance setting management to alter antenna impedance in response to touches detected at a touchscreen. When an end user body part 36 becomes proximate an antenna structure 28 reactive near field, tissue occlusion results in changes to the antenna impedance so that antenna return loss and antenna bandwidth efficiency as shown by the dotted lines leads to communication inefficiencies. Antenna controller 32 receives touch position and area information from display 24 and changes capacitor and/or inductor settings of an impedance tuning circuit 38 so that antenna impedance matches the resonance frequency of the transceiver signal. For a more rapid response, preset impedance matching settings stored in antenna performance table 34 may be applied for the operating conditions at transceiver 26. Alternatively, antenna controller 32 may compute impedance matching settings on a real time basis. In one alternative embodiment, a hysteresis delay may be added to prevent over compensation antenna performance settings where touches are transient in nature by delaying performance setting changes for a short period to ensure that the touch pattern remains consistent. In one embodiment, touch monitoring and antenna tuning are placed in idle states when wireless communication is not taking place.

Figure 3:
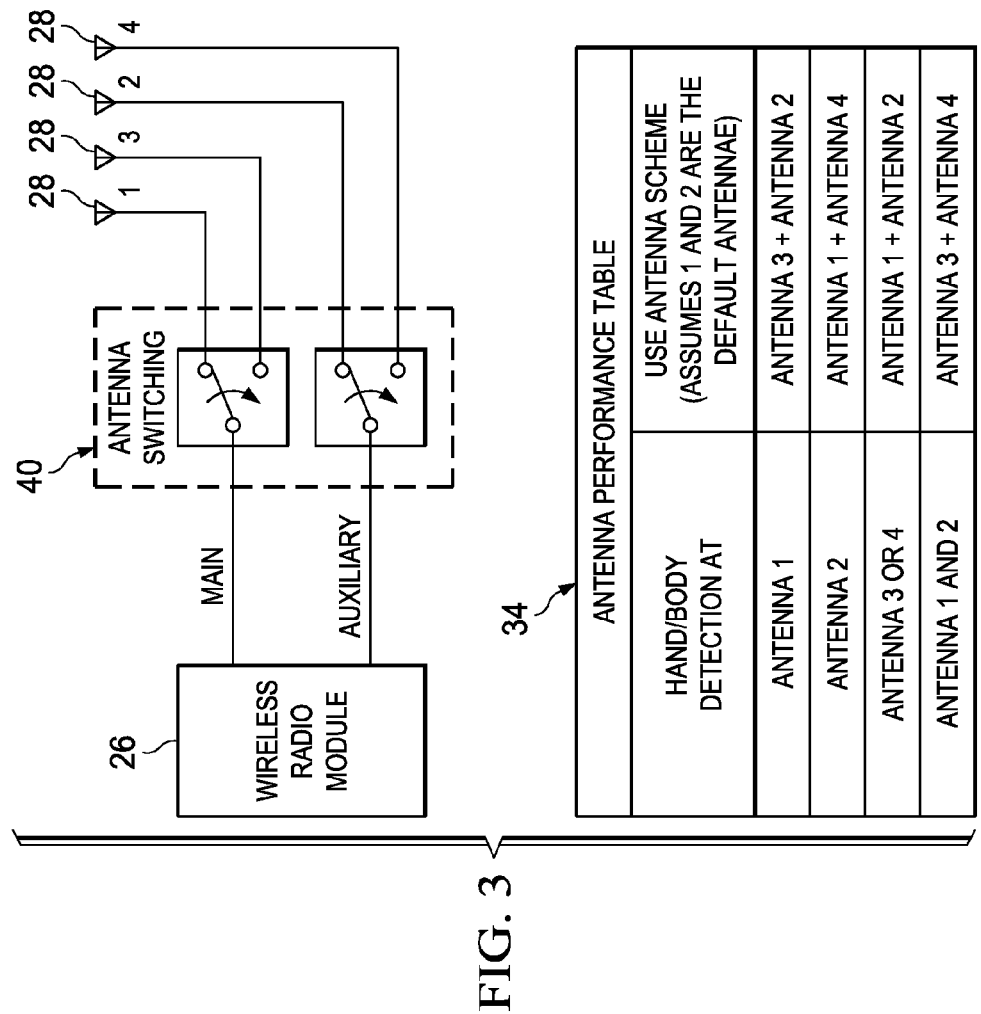
FIG. 3 depicts a block diagram of performance setting management to alter antenna selection in response to touches detected at a touchscreen.

Referring now to FIG. 3, a block diagram depicts performance setting management to alter antenna selection in response to touches detected at a touchscreen. Transceiver 26 sends and receives wireless signals through a set of antennae pairs. An antenna switch 40 selectively interfaces transceiver 26 with antenna 1 or antenna 3 on a main frequency, such as a WLAN frequency, and selectively interfaces transceiver 26 with antenna 2 or 4 as an auxiliary antenna. In alternative embodiments, different frequencies may be supported with different antennae pairs, such as an antenna pair for each of a WWAN, WLAN and WPAN frequency. Although a common configuration is to use two active antennae for each frequency at a time, in various embodiments one antenna or more than two antennae may be used with switching supported to optimize signal strength based upon detected touches at a touchscreen display. Antenna performance table 34 associates touch positions with active and idle antenna settings so that the antenna that has the least occlusion will interface with transceiver 26. In alternative embodiments, different numbers of antenna and combinations may be used as desired based upon likely touch locations at a portable information handling system.

Figure 4:
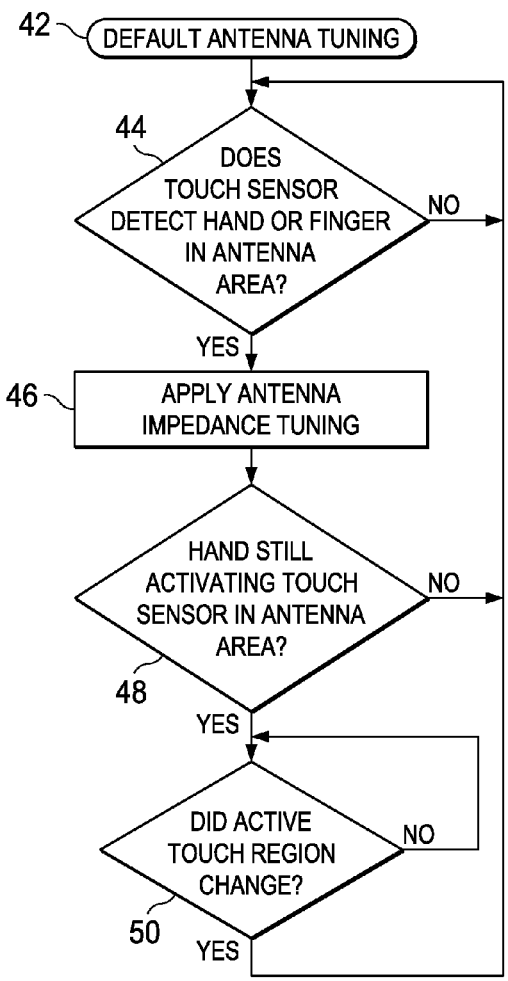
FIG. 4 depicts a flow diagram of a process for altering performance settings based upon touches detected at a touchscreen display.

Referring now to FIG. 4, a flow diagram depicts a process for altering performance settings based upon touches detected at a touchscreen display. The process starts at step 42 with initiation of antenna at default settings. At step 44, a state machine monitors touches at a touch display to detect if touches occur at the display in a pattern that indicates interference with antenna efficiency. If a touch is detected at the touchscreen, the process continues to step 46 to apply antenna impedance tuning associated with the detected touch pattern. At step 48 a determination is made of whether a touch remains on the touchscreen that activates the same pattern. If the touch has ended, the process returns to step 44 to monitor for additional touches. If at step 48 a touch detection remains, the process continues to step 50 to determine if the active touch region has changed from the originally-detected pattern. If not, the process enters a state machine at step 50 to monitor the detected touch state for any changes. If yes at step 50, the process returns to step 44 to monitor for a new touch pattern.

Figure 5:
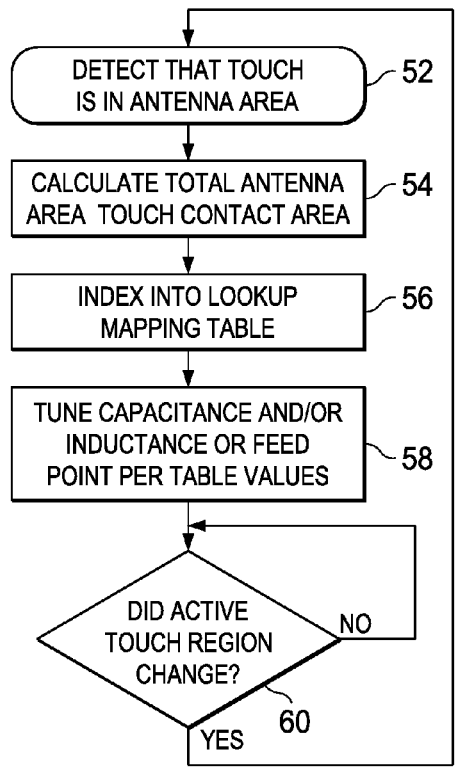
FIG. 5 depicts a flow diagram of a process for determining an impedance setting for an antenna based upon touches detected at a touchscreen display.

Referring now to FIG. 5, a flow diagram depicts a process for determining an impedance setting for an antenna based upon touches detected at a touchscreen display. The process starts at step 52 with detection that a touch has occurred in the antenna-sensitive area of a touchscreen display. At step 54 a calculation of the total area of the touch is done by abstracting the relevant touched areas on the touchscreen. At step 56, the touched area and location is looked up in the antenna performance settings table to determine an impedance adjustment for the relevant frequency. At step 58, the capacitance and/or inductance of the antenna feedpoint is tuned to match the predicted impedance of the antenna based upon the sensed touched area of the display touchscreen. At step 60, the impedance setting is maintained while the sensed touched are remains the same. When the sensed touch area changes, thus indicating a change in user touches proximate the antenna, the process returns to step 52 to detect any new touch conditions.

Figure 6:
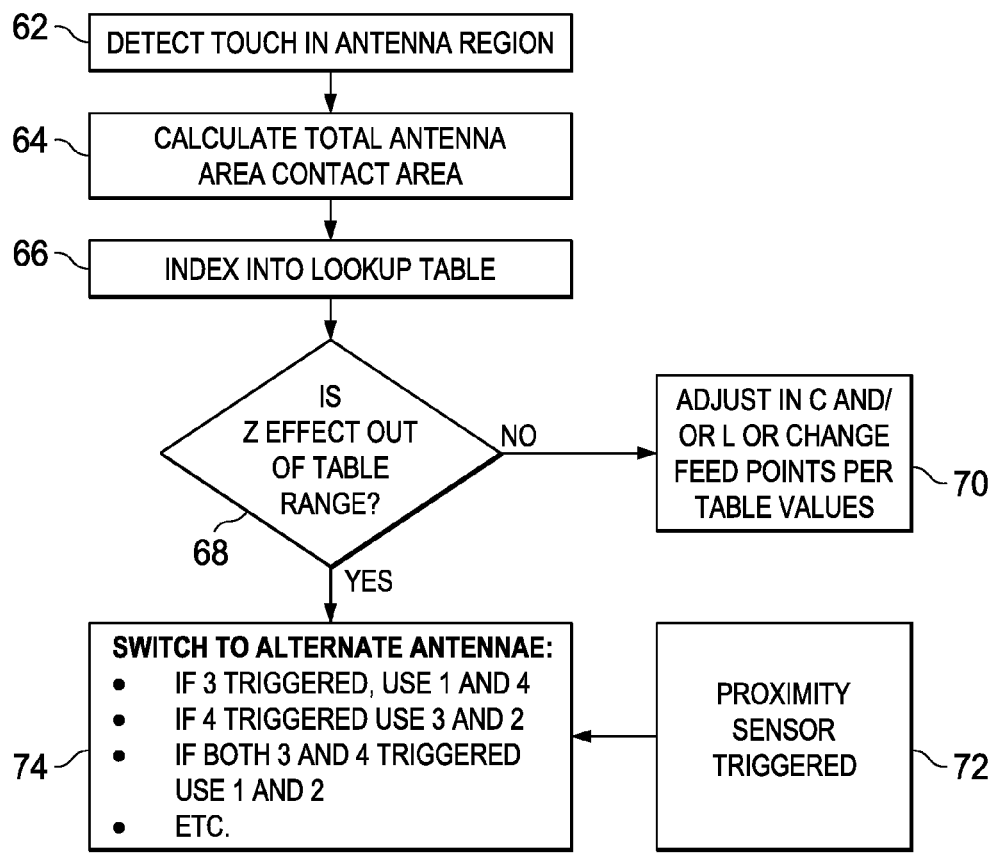
FIG. 6 depicts a flow diagram of a process for selecting between performance settings that set impedance and that select an antenna for communicating wireless signals.

Referring now to FIG. 6, a flow diagram depicts a process for selecting between performance settings that set impedance and that select an antenna for communicating wireless signals. At step 62, a touch is detected at the touchscreen in the area of an antenna. For example, in some embodiments only touches within a predetermined distance of the antenna will initiate the antenna controller's analysis of antenna performance settings. At step 64, the total antenna area contact area is calculated by determining touched areas of the display within a relevant area of the antenna for consideration with respect to antenna performance settings. At step 66 a lookup is performed at the antenna settings lookup table to determine performance settings for use at the antenna, such as impedance tuning settings. If at step 68 a determination is made that the impedance effect is out of an efficient or effective range for antenna impedance tuning, the process goes to step 74 to switch to an alternative antenna. Similarly, at step 72 a proximity sensor is monitored that, when triggered, initiates step 74 to switch to a different active antenna. If at step 68 the impedance effect falls within a tunable range, the process continues to step 70 to adjust the capacitance or impedance at the antenna feedpoint to obtain acceptable antenna performance. In one alternative embodiment, where the impedance impact is high at multiple possible antenna, an antenna is selected that provides the best predicted impedance match after correction is applied. For instance, a predictive model accepts relevant touches at the display and displayed input devices as inputs and applies the inputs to predict the antenna that will have the best wireless signal.

Those of skill in the art will recognize that antenna performance is often more of an art than a science. In that regard, feedback relating antenna performance to touchscreen touches provides a tool for intelligently adapting on a system-by-system basis each performance setting table to each end user. As an example, multiple antennae can be used in transmitter and receiver modes in an arrangement called a multiple-input multiple-output system that takes advantage of spatial diversity obtained with spatially separated antennae in dense multipath scattering environments. Stated more simply, angular orientation for a user position relative to a distal radio in a given space (i.e., walls of a building) effect the number of available channels and the reliable data rate. Tracking radio performance with user location and touchscreen touches provides data for an algorithm of the antenna controller to select which antenna of a pair should receive signals and which should send signals. Multiple combinations of antenna sets may be tried and selected over time to determine the most efficient antenna configuration for a given end user. For example, based upon touches detected at the display two antennae may be available in usage conditions where normally only one antenna would be active.

Although the present invention has been described in detail, it should be understood that various changes, substitutions and alterations can be made hereto without departing from the spirit and scope of the invention as defined by the appended claims.

What is claimed is:

1. A portable information handling system comprising:
a housing;
a processor disposed in the housing and operable to execute instructions to process information;
a memory disposed in the housing and interfaced with the processor, the memory operable to store the information;
a display integrated in the housing and interfaced with the processor and memory, the display operable to present the information as visual images and to accept touches as inputs;
a transceiver interfaced with processor and operable to communicate information with wireless signals;
an antenna interfaced with the transceiver to transmit and receive the wireless signals; and
an antenna controller interfaced with the display and the transceiver, the antenna controller operable to alter performance settings of the antenna based upon areas of the display that sense touches, the performance settings comprising antenna impedance and the antenna controller altering antenna impedance based upon touch proximity and size relative to a position of the antenna, the antenna controller imposing a predetermined latency before altering the antenna impedance, the latency preventing impedance changes for transient touch detection.

2. The portable information handling system of claim 1 wherein the antenna controller remains idle during idle transceiver operations.

3. The portable information handling system of claim 1 wherein the antenna comprises plural selectable antenna structures and the antenna controller alters antenna performance by selecting from the plural antenna the antennas that have a closest impedance match.

4. The portable information handling system of claim 1 wherein the antenna controller comprises a table having touches at defined display areas associated with impedance settings.

5. The portable information handling system of claim 1 wherein the antenna controller comprises a predictive model that estimates touched areas of at the information handling system housing from touched areas of the display.

6. A portable information handling system comprising:
a housing;
a processor disposed in the housing and operable to execute instructions to process information;
a memory disposed in the housing and interfaced with the processor, the memory operable to store the information;
a display integrated in the housing and interfaced with the processor and memory, the display operable to present the information as visual images and to accept touches as inputs;
a transceiver interfaced with processor and operable to communicate information with wireless signals;
an antenna interfaced with the transceiver to transmit and receive the wireless signals; and
an antenna controller interfaced with the display and the transceiver, the antenna controller operable to alter performance settings of the antenna based upon areas of the display that sense touches;
wherein the antenna controller averages the areas of the display touch over a time period to determine antenna performance settings.

7. A method for managing portable information handling system antenna, the method comprising:
monitoring a touchscreen display integrated in the portable information handling system for predetermined touches defined by touch location and area;
detecting the predetermined touches at the touchscreen display;
in response to the detecting, altering performance settings of an antenna integrated in the portable information handling system;
monitoring visual information presented at the touchscreen display;
predicting based on presented visual information that predetermined touches will occur; and
in response to predicting, altering the performance settings of the antenna.

8. The method of claim 7 wherein:
the presented visual information comprises an input screen presented to accept inputs from a user; and
in response to predicting comprises selecting an antenna from plural antennae to perform wireless communication, the selected antenna distal the input screen.

9. The method of claim 7 wherein altering performance settings comprises altering impedance of the antenna to a predicted matching impedance for the touch location and area.

10. The method of claim 7 wherein the predetermined touches defined by touch location and area include predicted touch areas at the portable information handling system housing and off the touchscreen display.

11. A method for managing portable information handling system antenna, the method comprising:
monitoring a touchscreen display integrated in the portable information handling system for predetermined touches defined by touch location and area;
detecting the predetermined touches at the touchscreen display;
in response to the detecting, altering performance settings of an antenna integrated in the portable information handling system; and
delaying the altering performance settings for a predetermined time after the detecting the predetermined touches, the delaying filtering transitory touches from initiating the altering.

12. An antenna system comprising:
plural antennae, each antenna interfaced with a radio transceiver and sized to fit in a portable information handling system housing;
a touchscreen disposed proximate the plural antennae, the touchscreen presenting visual information as images and accepting touches as inputs; and an antenna controller interfaced with the plural antennae and the touchscreen, the antenna controller operable to alter performance settings of the antenna based upon areas of the display that sense touches;

wherein the antenna controller is further operable to monitor visual images presented at the display to predict positions of end user interaction and to alter the performance settings based upon the predicted positions.

13. The antenna system of claim 12 wherein the performance settings comprise impedance tuning settings of the antenna.

14. The antenna system of claim 12 wherein the performance settings comprise selection of one or more of the plural antennae as active and selection of one or more antenna as idle, the selection based upon the relationship of the areas of the display that sense touches and the positions of the antennae.

15. The antenna system of claim 12 wherein the antenna controller is further operable to apply sensed touches to predict portions of the portable information handling system touched by the end user and to apply the predicted portions to alter the performance settings.

16. The antenna system of claim 12 further comprising a performance settings table having sensed touches and associated performance settings, the antenna controller looking up performance settings based upon sensed touches.

* * * * *